(12) United States Patent
Fergason (10) Patent No.: US 6,703,988 B1
(45) Date of Patent: Mar. 9, 2004

(54) MONITOR FOR SHOWING HIGH-RESOLUTION AND THREE-DIMENSIONAL IMAGES AND METHOD

(75) Inventor: James L. Fergason, Redwood City, CA (US)

(73) Assignee: Fergason Patent Properties, LLC, Menlo Park, CA (US)

( * ) Notice: Subject to any disclaimer, the term of this patent is extended or adjusted under 35 U.S.C. 154(b) by 218 days.

(21) Appl. No.: 09/611,541

(22) Filed: Jul. 7, 2000

Related U.S. Application Data
(60) Provisional application No. 60/142,752, filed on Jul. 8, 1999.

(51) Int. Cl.[7] .................................................. G09G 5/00
(52) U.S. Cl. ...................... 345/6; 345/5; 345/4; 345/7; 345/9; 348/52; 348/54; 348/57; 348/58; 348/59; 356/124.5; 356/126; 356/364; 356/369
(58) Field of Search ............................. 345/5, 6, 4, 7, 345/9; 359/630, 583; 348/42, 51, 52, 53, 54, 55, 56, 57, 58, 59; 356/124.5, 126, 364, 369

(56) References Cited

U.S. PATENT DOCUMENTS

| | | | | | |
|---|---|---|---|---|---|
| 3,777,059 A | * | 12/1973 | Wilkey, Jr. | ...................... | 345/9 |
| 5,300,942 A | * | 4/1994 | Dolgoff | ........................ | 345/32 |
| 5,421,589 A | * | 6/1995 | Monroe | .......................... | 345/9 |
| 5,976,017 A | * | 11/1999 | Omori et al. | .................. | 463/32 |
| 6,130,784 A | * | 10/2000 | Takahashi | .................... | 359/630 |
| 6,160,666 A | * | 12/2000 | Rallison et al. | ............. | 359/630 |
| 6,184,969 B1 | * | 2/2001 | Fergason | ..................... | 349/117 |
| 6,593,957 B1 | * | 7/2003 | Christie | ........................ | 348/42 |

\* cited by examiner

*Primary Examiner*—Richard Hjerpe
*Assistant Examiner*—Jean Lesperance
(74) *Attorney, Agent, or Firm*—Renner, Otto, Boisselle & Sklar, LLP (57) ABSTRACT

A display system or monitor arrangement for stereoscopic displaying of images includes a pair of displays for providing respective left eye and right eye images and arranged in perpendicular intersecting planes, a beam splitter for combining the images from the displays in a common light path, and a means to discriminate between respective images to present the respective left and right eye images to the eyes of a viewer for viewing. Image discriminating functions may be obtained using plane polarized light characteristics and/or circular polarized light characteristics. A package arrangement retains the display a system components for storage or use; and a cubical mount structure may provide alignment and positioning of respective parts of the display system. Display methods for displaying stereoscopic images in a common light path are included.

68 Claims, 5 Drawing Sheets

MONITOR FOR SHOWING HIGH-RESOLUTION AND THREE-DIMENSIONAL IMAGES AND METHOD

Priority of Provisional U.S. Patent Application No. 60/142,752, filed Jul. 8, 1999, is claimed under 35 USC 119(e).

TECHNICAL FIELD

Presently three-dimensional displays are based either on imaging techniques which give rise to an apparent stereo by perspective views or on two images being presented which are separated such that the right eye and left eye see their respective images which are distinguished or differentiated by polarization characteristics of light. Most of these displays are single purpose in that they are designed for the purpose of viewing stereo. Two images separated or distinguished by polarization can either be superimposed as they are with two movie projectors or they may be displayed time sequentially to give an image which appears to be continuous.

The current stereo display techniques are confined to using field sequential techniques which either require very fast video switching thus needing a very rapid display or require two small displays worn in a headset. The field sequential methods or techniques are prone to flicker as the two images are superimposed upon each other in time sequence. Part of the flicker problem is the very high contrast between the right and left image, e.g., the right image is expected to be viewed by the right eye of a person viewing the image (viewer) and the left image is expected to be viewed by the left eye, while those images are being presented which makes them flicker even at higher than normal frame rates. Also, a consequence is a reduction in bandwidth capability since the two images presented are normally in a standard bandwidth for two dimensions.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

DESCRIPTION

This invention includes two flat panel displays which are arranged at an angle relative to each other, for example, at 90 degrees or approximately 90 degrees and a beam splitter which is positioned at the bisectrix between the two displays. As an example of a bisectrix, consider two flat panel displays, the planes of which are parallel with the same linear axis; thus, for example, the two planes may be arranged similar to the front and back covers of a book, with the spine of the book representing the axis. The bisectrix would be an angle that bisects the angular relation of the two planes (displays or book covers); and, more preferably, the bisectrix would be a plane that also is parallel to the linear axis (e.g., like the book spine) and bisects the angle equally between the first two mentioned planes (e.g., the displays). As is described further below the images from both displays may be viewed; and if the images provided thereby are, respectively, left and right eye images, which can be discriminated, e.g., by polarized lenses or some other means, a stereoscopic (3D) display is obtained.

If the flat panel displays are liquid crystal displays, the light output of each display will be polarized. The usual polarization direction for many active matrix displays, for example, is at 45 degrees to the edge of the display. This characteristic of such liquid crystal displays allows the present invention to be carried out with relative efficiency and minimum parts.

When linear polarized light is reflected from a surface that is in a plane which is perpendicular or transverse to the direction of incident light, it does so without a change in direction of polarization. However, if the reflecting surface (in this case the beam splitter) is set at an angle to the surface of one of the liquid crystal displays such that the reflected image changes direction by 90 degrees or approximately 90 degrees and the direction of polarization is at 45 degrees to the change of direction, the result will be that the linear polarized light will appear to have rotated 90 degrees. As an example, consider two adjacent flat panel displays, each in a vertical plane, the two meeting at and including a common linear axis and being oriented so the displays are at 90 degrees relative to each other, and each display providing a light output that is polarized in the same direction, e.g., from the lower left toward the upper right of the respective display, say at an angle of 45 degrees relative to horizontal or vertical (not considering sign). The beam splitter is oriented between the displays, has its plane (or an extension thereof) intersecting the linear axis mentioned, and is at an angle of 45 degrees relative to each display; and the beam splitter is so positioned relative to the two displays that one can be viewed directly through the beam splitter and the other can be viewed by reflected light from the beam splitter to provide a virtual image of the latter display.

If the two displays are positioned with respect to the beam splitter such that the virtual image of one display is exactly superimposed on the other, the beam splitter will reflect the angle of the polarization vector at right angles to the display which is not reflected. Consider as an example the polarization direction of light incident on the beam splitter intended for reflection to be represented by an arrow pointing in the direction of polarization; the reflected light from the beam splitter will present the mirror image of the arrow, and, therefore, the arrow will appear to a viewer to be at 90 degrees (crossed) relative to the original polarization of the incident light on the beam splitter (and, thus, also crossed relative to the polarization direction of light transmitted directly through the beam splitter from the other display). Therefore, the reflected image from the beam splitter and the direct image viewed through the beam splitter have linear polarization directions that are at right angles; and this can be accomplished without additional elements.

If an electronic signal is received corresponding to the left and right image they can be displayed separately on the two liquid crystal display panels. They can be seen by the left and right eye in the proper order by using glasses which are linearly polarized at right angles to each other and parallel to the image that is intended for the left or right eye.

Although the invention is described using Liquid crystal displays (LCDs), it will be appreciated that the invention may use other displays or image generators, provided the light output from the displays is polarized or is given polarization characteristics, e.g., by using one or more polarizers in the light path. For convenience of description and to avoid adding unnecessary verbiage, the image generators or displays are considered and described herein as active matrix LCDs, but it will be appreciated that other displays or image generators may be used.

It may be desirable at times to use circular polarized light to separate the two images mentioned above. This can be done in several ways, two of which are mentioned here by way of example. The first is by putting quarter wave plates at both image generators, such as the LCDs, with their slow axis horizontal or vertical on each of the LCDs. More generally, the slow axis of the quarter wave plates is at 45 degrees to the polarization direction of linear polarized light from the respective LCDs. This continues to maintain the same structure on both displays. When the circular polarized light is reflected from the beam splitter it reverses its sense; thus, right circular polarization becomes left circular polarization. A second way of achieving two circular polarizations is to place a quarter wave plate at the exit bezel or a location optically downstream of the two LCDs so that both the direct view image and the virtual image light go through the quarter wave plate and become circularly polarized. Thus, the slow axis is at 45 degrees to the two polarizations which were generated and provided by reflection or transmission at the beam splitter.

Circular polarizers are generally produced by bonding a quarter wave plate to a linear polarizer such that the linear polarizer is toward the observer. The quarter wave plate converts right-handed circular polarized light to linear polarized light, and it converts left-handed circular polarized light to linear polarized light, except the polarization directions of the two linear polarized lights are at right angles to each other. Since most circular polarizers which use quarter wave plates are tuned for green light, they are not perfect. In order to achieve a higher performance the circular polarizer may be mounted so that the polarized direction of the linear polarizer at the output is perpendicular to the linear polarization at the display for the nullification of the transmitted image. For the reflected image the direction should be parallel for the linear polarization at the polarizer and display respectively.

The information is presented to the displays of the invention such that the information in one display is a mirror image so that its reflection from the beam splitter is a normal image. This is normally done electronically but it can be accomplished by how the video signal is brought into the flat panel display. For displays that are mounted vertically the reflected display can be scanned from right to left instead of left to right. Depending upon the signal the video signal can be reversed either line at a time or frame at a time.

The invention has additional useful features. By displaying normal video images which are field sequential one field can be displayed on one display and the other field on another, thus allowing a signal from both fields to be present at one time. This arrangement reduces motion artifacts since both fields are simultaneously displayed. The liquid crystal display continuously holds the image until it is changed. This also makes possible the display of HDTV images which are based on field sequential at half the bandwidth in each display. A further advantage in this form of mixing is an improvement in the color separation. The color in many flat panel displays is based on vertical lines of red, green, blue and white. When they are reflected they go from white blue green and red thus giving a different order to the colors in reflection. This reduces color borders and other artifacts caused by the color sequence above.

The present invention has the ability to display images in three dimensions and also has the ability to improve the resolution and color artifacts of flat panel monitors.

Figure 1:
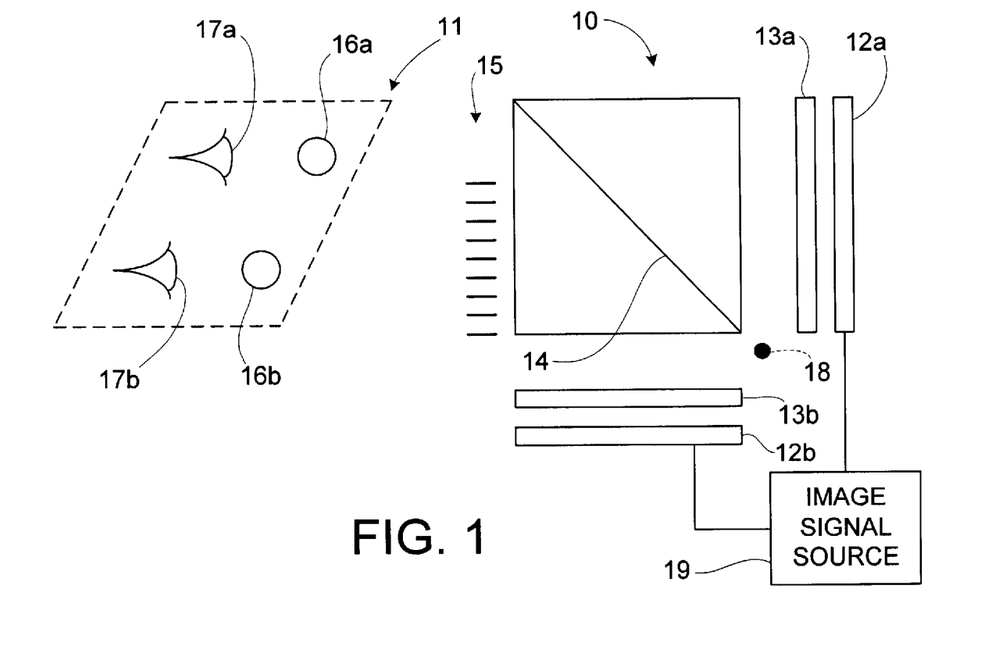
FIG. 1 is a schematic illustration of a monitor for showing high-resolution and three-dimensional images using plane polarized light in accordance with the invention and of a viewer viewing such images.

Referring to the drawings wherein like reference numerals designate like parts in the several figures, and initially to FIG. 1, a monitor for showing high-resolution and three-dimensional images is generally illustrated at 10 being viewed by an individual 11 as a viewer of images provided or shown by the monitor. The monitor 10 includes a pair of liquid crystal displays 12a, 12b and a pair of linear polarizers 13a, 13b. The displays 12a, 12b may have integral polarizers, as in active matrix displays, in which case separate polarizers 13a, 13b would be unnecessary. The displays 12a, 12b and polarizers 13a, 13b provide linear polarized light images to a beam splitter 14 of the monitor 10. The image from the display 12a and polarizer 13a is viewed directly by the viewer 11 as light therefrom is transmitted directly through the beam splitter 14. The image from the display 12b and polarizer 13b is reflected by the beam splitter toward the viewer 11; the direction of polarization of the linear polarized light provided from the display 12b and polarizer 13b is rotated 90 degrees due to the mirror image effect described above so that the light 15 reaching the viewer 11 includes two images, one from each display 12a, 12b and the polarization directions of the linear polarized light representing such images are crossed, e.g., at 90 degrees to each other, as was described above. The viewer 11 uses linear (plane) polarizers 16a, 16b to view by his or her eyes 17a, 17b the left and right eye images from the monitor 10. The polarizer 16a, for example, transmits linear polarized light from a respective display, e.g., display 12a, which is intended to be viewed by the left eye of the viewer; and the polarizer 16b, for example, transmits linear polarized light from the other display, e.g, display 12b, providing the right eye image to the right eye of the viewer 11. The beam splitter 14 is shown as a prism beam splitter, but it will be appreciated that other types of beam splitters may be used; many are well known in the art.

It will be appreciated that the monitor 10 of FIG. 1 has its parts arranged as was described above. For example, the displays 12a, 12b may be flat panel displays which are arranged in a vertical, horizontal, or some other common direction, and the planes thereof are parallel with an imaginary linear axis 18 which extends in a direction perpendicular to the plane of the drawing relative to the illustration of FIG. 1. Also, the eyes of the viewer 11 are shown somewhat in perspective relative to the drawing, as they typically would be aligned in parallel with the axis 18 for optimum viewing, although some off-axis alignment may be acceptable.

An image signal source 19 is illustrated. Such source may be a video source, a computer, a tape player or CD Rom player, etc. The image signal source may be remote and the image signal may be provided via a network or the like. The image signal source provides signals to the displays 12a, 12b as a usual video circuit or video card provides signals to a display to create images for viewing. If desired, the image signal source 19 may include circuitry for reversing the direction of scanning or reversing the image being provided to a respective display, as was mentioned above.

Figure 2:
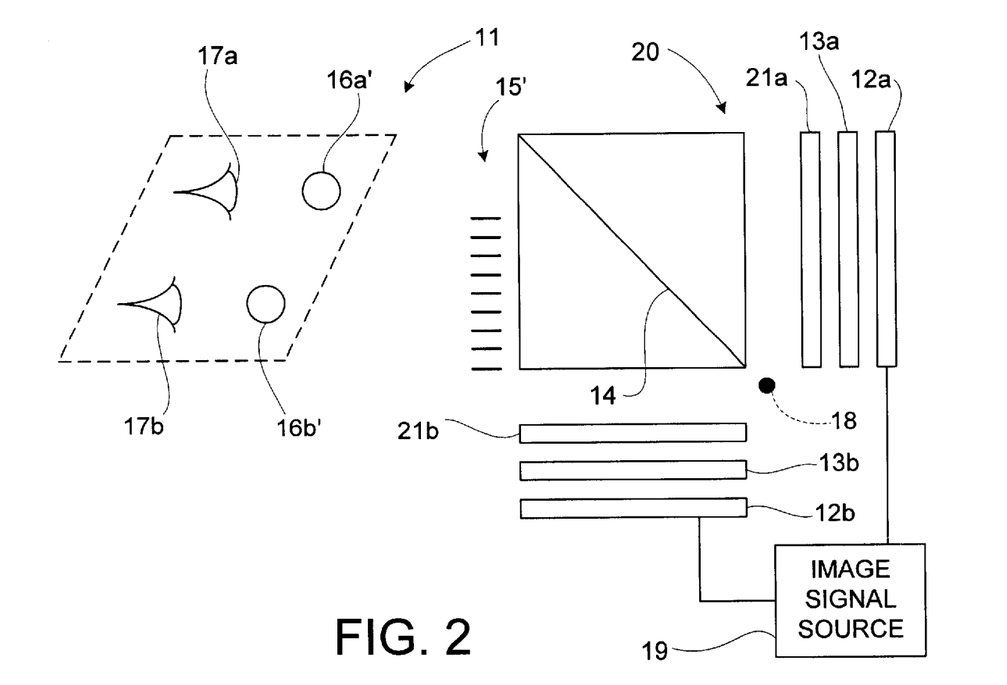
FIG. 2 is a schematic illustration of a monitor for showing high-resolution and three-dimensional images using circularly polarized light in accordance with the invention and of a viewer viewing such images.

Turning to FIG. 2, another monitor for showing high-resolution and three-dimensional images is illustrated generally at 20. The monitor 20 is similar to the monitor 10, except the monitor 20 uses circular polarized light. Accordingly, respective quarter wave plates 21a, 21b are provided to convert linear polarized light from the respective displays 12a, 12b and, if used, linear polarizers 13a, 13b, to circular polarized light. The light output 15' may include both left and right circular polarized light, and the circular polarizers 16a', 16b' respectively transmit one or the other of such left or right circular polarized light to respective eyes 17a, 17b of the viewer 11 for viewing respective left and right eye images. Although the direction of circular polarization of light incident on the beam splitter from the two displays 12a, 12b may be the same, the beam splitter reverses the direction of circular polarization of the light it reflects from the display 12b, as was described above. The circular polarizers 16a', 16b' can distinguish or discriminate between the left and right circular polarized light to provide 15 respective images to the eyes 17a, 17b of the viewer 11.

Figure 3:
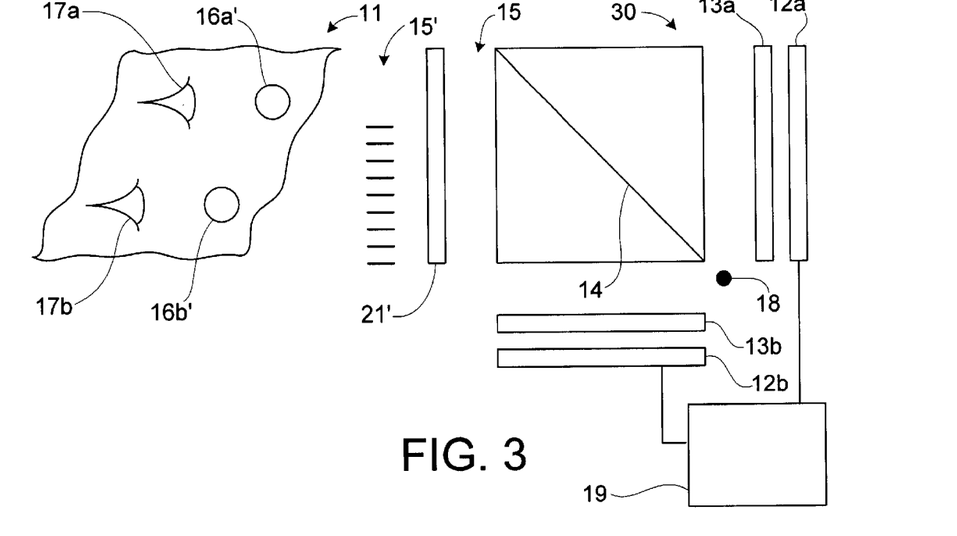
FIG. 3 is a schematic illustration of another embodiment of a monitor for showing high-resolution and three-dimensional images using circularly polarized light in accordance with the invention and of a viewer viewing such images.

Referring briefly to FIG. 3, another monitor for showing high-resolution and three-dimensional images is illustrated generally at 30. The monitor 30 is similar to the monitor 20, except the monitor 30 uses only one quarter wave plate 21' to obtain both left and right circular polarized light from the respective linear polarized light inputs thereto from the displays 12a, 12b, linear polarizers 13a, 13b (if used), and beam splitter 14. The quarter wave plate is arranged relative to the polarizers 13a, 13b or the direction of linear polarized light so the slow axis is at 45 degrees relative to the direction or plane of such linear polarization.

Figures 4, 5:
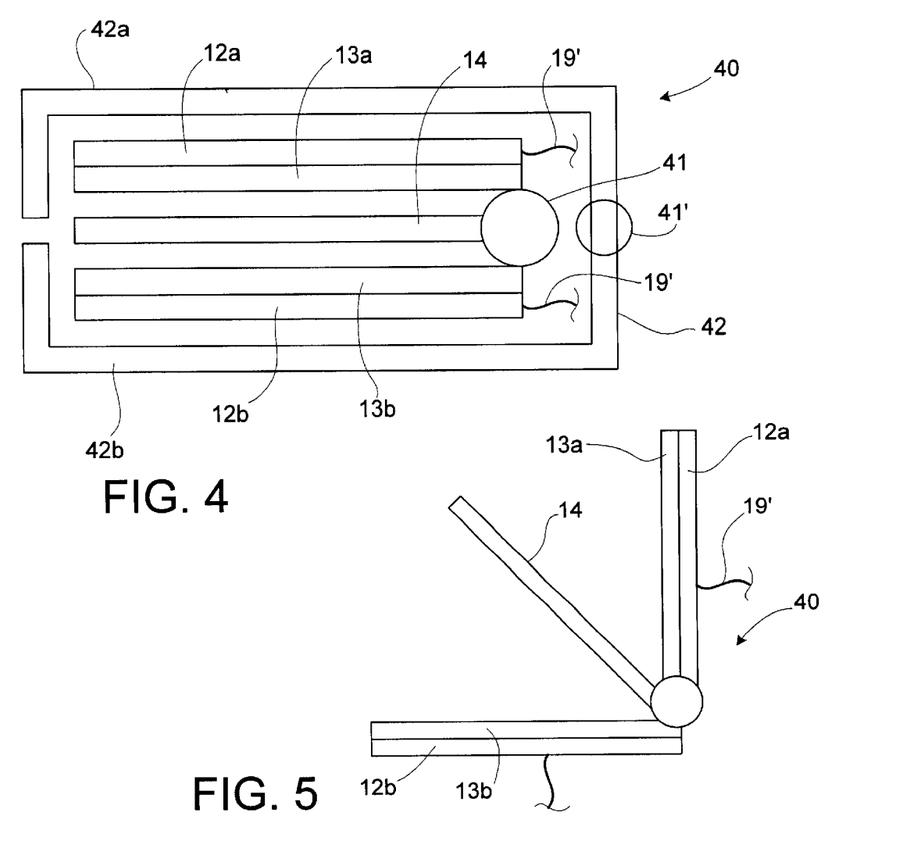
FIG. 4 is a schematic illustration of an embodiment of monitor of the invention in folded condition.
FIG. 5 is a schematic illustration of the embodiment of monitor of the invention of FIG. 4, here shown in partly open condition.
Figure 6:
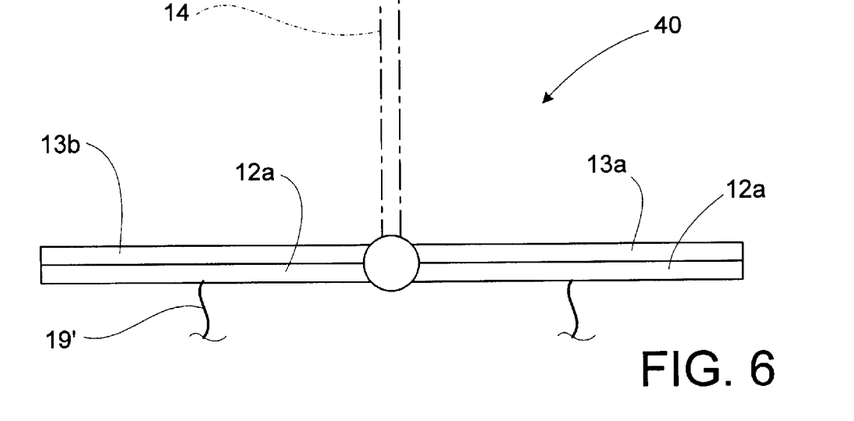
FIG. 6 is a schematic illustration of the embodiment of monitor of the invention of FIGS. 4 and 5, here shown in fully open condition.

Turning to FIGS. 4, 5 and 6 a packaged monitor for showing high-resolution and three-dimensional images and, alternatively, for showing multiple images in parallel, is shown generally at 40. In FIG. 4 the monitor 40 is in closed condition; in FIG. 5 the monitor 40 is in partly open condition; and in FIG. 6 the monitor 40 is in full open condition. The monitor 40 includes a hinge 41 relative to which the displays 12a, 12b, linear polarizers 13a, 13b, and beam splitter 14 are mounted. In FIG. 4 those components are pivoted on or relative to the hinge 41 and to each other to assume a relative compact nested arrangement, e.g., for storage in a minimum space. A protective cover or package 42, including cover portions 42a, 42b, possibly hinged at 41', as is illustrated in FIG. 4, may be placed over those components to avoid damage while in stored condition. Connections 19' may be provided to couple the displays to an image signal source or, if desired, the image signal source may be appropriately mounted in the package 42.

As is illustrated in FIG. 5, the monitor 40 includes the displays 12a, 12b, linear polarizers 13a, 13b (and quarter wave plates, if used), and beam splitter 14 arranged in partially open condition relative to the stored condition; this partially open condition is obtained by rotation or pivoting relative to the hinge 41. If desired appropriate stops may be used to help align the components relative to each other in orientation similar to that described above with respect to FIGS. 1–3.

As is illustrated in FIG. 6, the monitor 40 includes the displays 12a, 12b, linear polarizers 13a, 13b (and quarter wave plates, if used), and beam splitter 14 arranged in fully open condition relative to the stored condition; this fully open condition has the displays 12a, 12b oriented in adjacent parallel relation so both can be viewed side by side to present increased amount of information to the viewer. Such orientation is obtained by rotation or pivoting relative to the hinge 41. If desired appropriate stops may be used to help align the components relative to each other as illustrated in FIG. 6.

Thus, it will be appreciated that the monitor 40 may be used to provide either stereo views or large area mono views of respective images. Furthermore, the invention provides a device for not only displaying three dimensions but also improving the resolution and color artifacts of flat panel monitors.

The various methods of using the invention are described above. Summarizing, though, it will be appreciated that using the invention, e.g., as illustrated in FIGS. 1–3 and 5, two images are provided and can be discriminated by polarization characteristics to obtain respective images for viewing. The two images may be provided simultaneously without the need to provide frame or field sequential images or time sequential images (e.g., one image for viewing by one eye and the next image or viewing by the other eye, and so forth); thus, increased resolution and reduction of flicker can be obtained. Further, if desired, using the invention as illustrated in FIG. 6, large area display may be obtained by displaying respective images on adjacent displays 12a, 12b, for example.

Although the invention has been shown and described with respect to a certain preferred embodiment or embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

It will be appreciated that portions of the present invention can be implemented in hardware, software, firmware, or a combination thereof. In the described embodiment(s), a number of the steps or methods may be implemented in software or firmware that is stored in a memory and that is executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in flow charts may be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The above description and accompanying drawings depict the various features of the invention. It will be appreciated that the appropriate computer code could be prepared by a person who has ordinary skill in the art to carry out the various steps and procedures described above and illustrated in the drawings. It also will be appreciated that the various terminals, computers, servers, networks and the like described above may be virtually any type and that the computer code may be prepared to carry out the invention using such apparatus in accordance with the disclosure hereof.

Figure 7:
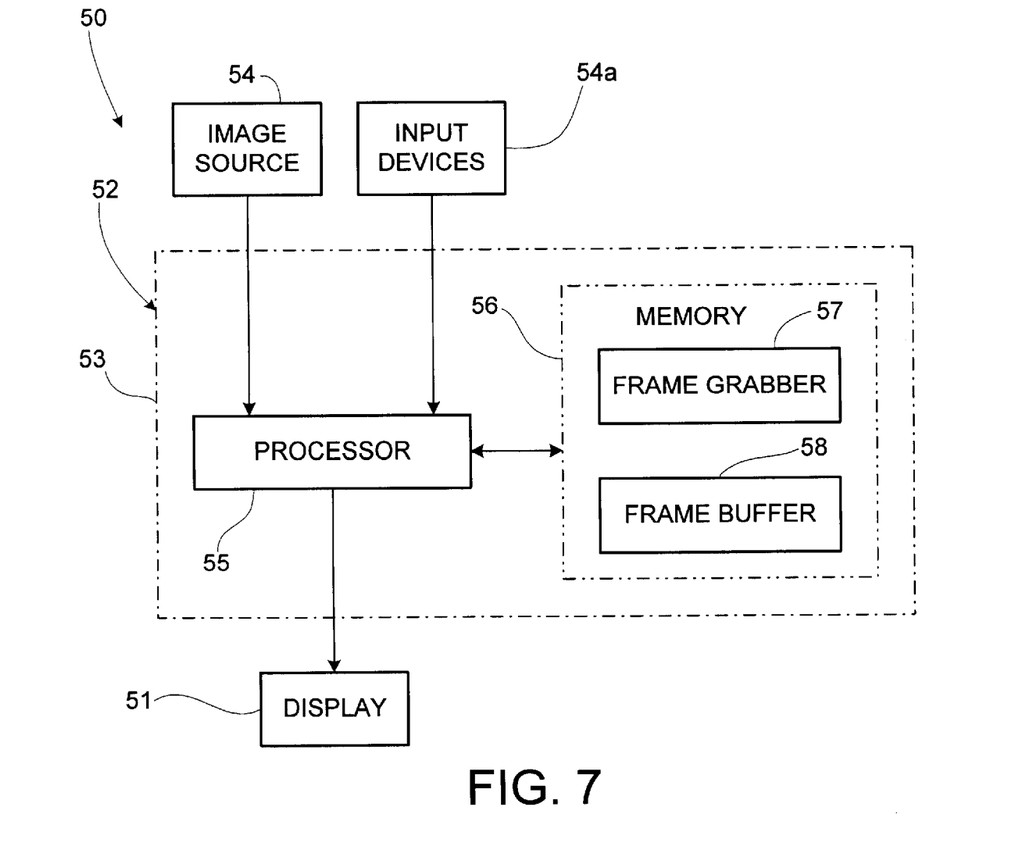
FIG. 7 is a schematic illustration of a display system according to an embodiment of the invention.

Turning to FIG. 7, a system for implementing the invention is illustrated at 50. The system 50 includes a display 51, such as the monitors 10, 20, 30, 40 described above. The system 50 also includes an image signal source 52 to provide appropriate signals to the display 51 to create images for viewing. The image signal source 52 includes, for example, a computer 53 and an image source 54. The image source 54 contains information or provides information to the computer 53 which supplies signals to the display 51 to create images for viewing. The image source may be, for example, a video source, a tape player, a CD-ROM player, a connection to a network to receive signals from a remote device, or a computer program, for example, which is operable on the computer 53 to develop images, such as for playing a game, for presenting architectural or mechanical drawings, etc. Also associated with the computer 53 are input devices 54a, such as a keyboard, mouse, pointing device, or some other input signal providing mechanism to provide inputs to the computer to operate the same in a desired fashion.

The computer 53 includes a processor 55 and a memory 56. The processor may be a conventional microprocessor, such as, for example, one from Advance Micro Devices sold under the trademark ATHALON or one sold under the trademark K-6, a microprocessor sold by Intel Corporation under the trademark PENTIUM, or another processor. The memory 56 may include non-volatile memory, such as ROM, CD-ROM, DVD, etc. and/or volatile memory, such as random access memory. Portions of the memory 56 may be designated as illustrated as a frame grabber 57 and as a frame buffer 58.

It will be appreciated that the several parts of the computer 53 described herein are exemplary. Other components, such as processors, memories, input/output devices, commonly used, currently available, and/or that may be developed in the future may be used to carry out various functions disclosed and described herein in accordance with the present invention and, thus, are equivalents of the illustrated and described exemplary embodiment.

Signals representing an image or characteristics of an image are provided the processor 55. Those signals may be supplied via the image source 54 or, if desired, the image source 54 may be part of the memory 56, such as a CD-ROM, DVD or some other device included in or coupled to the computer 53 to provide the image information. In many display systems images are presented on a display, such as the display 51, as a series of sequentially presented frames. Signals representing a given frame, say from the image source 54, may o be provided by the processor 55 to a frame grabber 57. The frame grabber may be a portion of the memory 56 selected to grab or to accumulate the information related to a given image frame. If the image signals include stereoscopic images, for example, a left image and a right image, sometimes referred to as a stereo pair, the frame grabber 57 may include two respective portions, one for grabbing and storing the left image and one for grabbing and storing the right image of a given frame or pair of frames for a given stereoscopic image. The frame buffer 58 is provided with the image signals, for example, on a bit mapped basis, and supplies those signals via the processor 55 to the display 51 for viewing by a viewer. The frame buffer 58 may include two portions, for example, one that stores the left image and one that stores the right image, and the processor directs the respective image information to the respective displays 12a, 12b (FIG. 1), for example.

Summarizing operation of the system 50, the processor 55 receives the image signals from an image source and supplies corresponding data representing a given frame or pair of frames to the image grabber 57. When the data representing a given image or pair of images (left and right images) in the frame grabber 57 has been completed, the processor stores the frame data in the frame buffer 58 and from the frame buffer 58 the processor either directly or via an appropriate output circuitry, such as a VGA card or the like, to the display 51 for presentation to and viewing by a viewer 11. Various techniques may be used to obtain the image data and to provide it to the frame buffer 58. It may be unnecessary to use a frame grabber 57 in which case the image data may be supplied from some image source 54 via the processor 55 directly to the frame buffer, for example. Other devices may be used, too, to obtain image data, to process the data and to provide it to the display 51, the computer 53 being only one example of such a device and method.

As was mentioned above, the image provided by the display 12b (FIGS. 1, 2 and 3) is reflected by the beam splitter 14 and provided as part of the output light 15. Such reflected image in a sense is a virtual image because it is reversed due to the reflection by the beam splitter. Also, as was mentioned above, the image presented by the display 12*b* is inverted so that when it is reflected by the beam splitter 14, the reflected virtual image and the image from the display 12*a*, which is transmitted through the beam splitter 14 will be substantially superimposed in proper relation to allow viewing of a stereoscopic image by a viewer 11. Such inverting of the image presented by the display 12*b* may be accomplished in a number of different ways, several of which are described here and others which may be equivalents also may be used. For example, the device which obtains the image data for the display 12*b*, such as a video camera, charge coupled device (CCD), etc., may be operated to perform its scanning in the reverse direction relative to the usual direction of scanning so that the data provided the frame buffer 58 and the display 12*b* when presented in the usual scan direction would be reversed. Alternatively, the image data provided the frame buffer 58 by the processor 55 for delivery to the display 12*b* may be inverted electronically prior to being stored in the frame buffer 58. In the latter case, an example would include the frame grabber 57 receiving image data for the left image and right image of a given frame and that data subsequently is stored in the frame buffer 58, but prior to being stored in the frame buffer 58, the image data for one of the frames is inverted. A further possibility is to store the image data for the left and right images of a given frame in the frame buffer 58 and when delivering that data to the respective displays 12*a*, 12*b*, inverting the data provided to the display 12*b* essentially in real time as it is provided thereto.

Figure 8A:
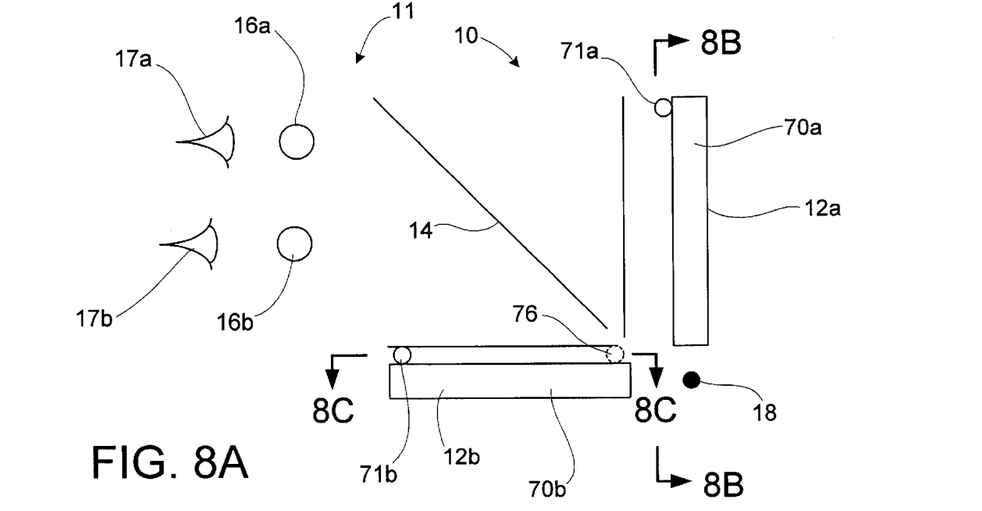
FIGS. 8A, 8B and 8C are schematic illustrations of an embodiment of the invention illustrating the reversal or inversion of images one of the respective displays in the monitor of the invention.
Figure 8B:
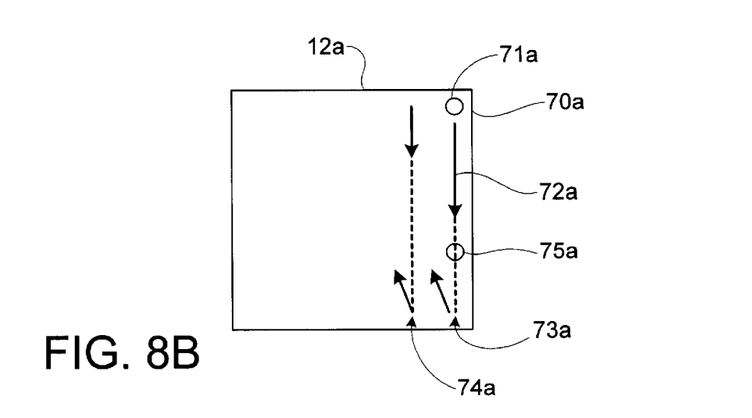

The image inverting described above is shown schematically in FIGS. 8A, 8B and 8C. FIG. 8A is similar to FIG. 1 showing the monitor 10, displays 12*a*, 12*b*, and the beam splitter 14. FIG. 8B is a plan view of the display 12*a* as it is seen by the viewer 11. The top 70*a* of the display 12*a* is at the right hand side of the illustration in FIG. 8B. Relative to the point of view of the viewer 11 looking at the monitor 10 and seeing through the beam splitter 14 the image presented by the display 12*a*, a point, pixel, component of the image, etc., at the upper left corner of the display 12*a* is represented by a solid line circle 71*a*. In FIG. 8B the direction of scanning image data or providing the image data to the display 12*a* is represented by the arrows 72*a*. Although the providing of image data to a given line 73*a*, 74*a*, etc., of the display 12*a* is referred to as a scan direction, in many liquid crystal display devices all of the image data is presented to a given line at a single time. All the image data to an entire display may be provided simultaneously or substantially simultaneously directly from the frame buffer. Direction of scan, though, sometimes is referred to with respect to some CRT (cathode ray tube) devices. Regardless of how the data is presented, though the data at the location 71*a* of the display 12*a* is seen at the upper left corner of it as a viewed by the viewer 11. The data or image representing the data at a location 75*a* is seen part way across the scan line, line of pixels, etc., of the display 12*a* near the top 70*a* thereof. Other data also may be provided to pixels of the display 12*a* to present image information for viewing by the viewer 11.

Figure 8C:
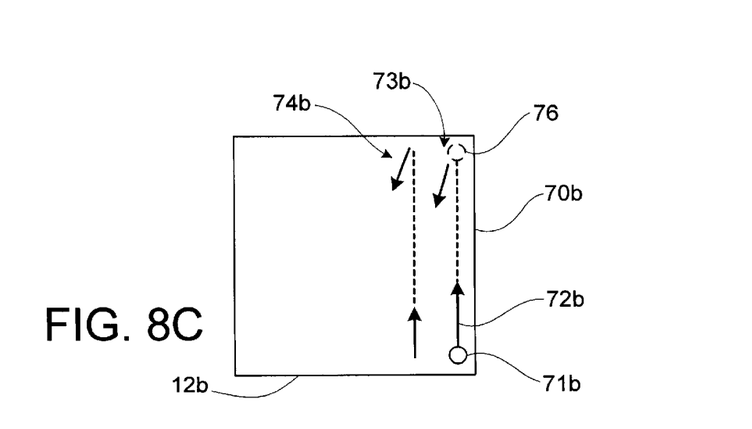

To demonstrate the reversing of the image information presenting on the display 12*b*, the display 12*b* is shown in FIG. 8C in parallel with the display 12*a* of FIG. 8B. Thus, FIG. 8C is a plan view of the display 12*b* from FIG. 8A, but such plan view is rotated 90 degrees in the direction of the arrows 8C—8C, e.g., about the axis 18. The top of the display 12*b* is identified 70*b* for convenient reference in FIGS. 8A and 8C for relational correspondence generally with the top 70*a* of the display 12*a* in FIGS. 8A and 8B. An image point 71*b* shown on the display 12*b* is provided on the top right of the display 12*b*. A virtual image view, i.e., the reflection from the beam splitter 14 will in effect make the point 71*b* appear somewhat superimposed or somewhat coincident but nevertheless somewhat shifted for stereoscopic imaging and viewing, relative to the image point 71*a* of the display 12*a*. Scanning of the image data or providing of the image data to the display 12*b* is in accordance with the direction of the arrows and lines 72*b*, 73*b* and 74*b*. It will be appreciated that such scanned direction or presenting of data is in effect inverted or opposite to the direction in which data is provided the display 12*a* (FIG. 8B). If the image data to the display 12*b* were not so inverted or reversed, the image point 71*b* would appear at location 76 in the display 12*b* (as is seen in FIGS. 8A and 8C) and, thus, would not coincide for a proper image presentation with a image point 71*a* of the display 12*a*.

As was described above, various techniques can be used to invert or to reverse the image data to obtain the desired stereoscopic image.

It will be appreciated that although the invention is described above with respect to flat panel display devices of the liquid crystal type, the invention may be used with other displays. However, if the displays do not have flat characteristics, the advantages of alignment, reflection minimization, and other features of flat panel display technology would not necessarily be available.

As was mentioned above, too, exemplary active matrix flat panel displays typically are rectangular and, for example, if relatively square, have the polarization axis of the output light at approximately 45 degrees to an edge of the display. This arrangement facilitates alignments of the various components hereof as was mentioned above. However, if desired, other polarization alignments may be employed and, if necessary, accounted for to enable discrimination between respective left and right images.

Although the beam splitter 14 is shown in FIGS. 1–3 as a prism type beam splitter device, it will be appreciated that other types of beam splitters may be used. An example is a glass plate, a sheet material that is semi-transparent and semi-reflective, or some other device that is able to transmit light from the respective displays for viewing by a viewer 11.

The images displayed by the display 12*a*, 12*b* may be presented to the viewer 11 simultaneously without the need for field sequential operation. to Therefore, a high resolution image with minimal or substantially no perceptible flicker may be presented to the viewer and in such an embodiment, since all image data may be presented substantially simultaneously to and/or displayed by both displays, very high resolution is possible.

From the foregoing, then, it will be appreciated that the monitors 10, 20, 30 of the invention provide a display system useful to present stereoscopic or monoscopic images for viewing.

The images may be provided the displays 12*a*, 12*b* (sometimes referred to as display generators or as image generators) as stereo pairs. A stereo pair is a pair of images which, respectively, represent the left eye and right eye views of an image. The image data representing two images of the stereo pair may be provided to the frame buffer, for example, for temporary storage and delivery to the respective displays 12*a*, 12*b*. In some prior devices the left and right images are provided sequentially to a common display, and the sequential images are discriminated and provided for viewing to respective eyes of a viewer. In the present invention, though, the left and right images may be shown either sequentially, one on one display and one on the other display, or the left image may be shown on one display while the right image is shown on the other display. In prior display systems which use a common display to show sequentially left and right images, there may be a loss of some data that is displayed to the viewer, for example, due to various techniques employed to deliver data and to display images representing the data. The present invention allows all data for one image of a stereo pair to be presented the viewer and all data from the other image to be presented to the viewer, thus enhancing resolution, clarity, brightness, and other characteristics of the viewed image relative to the prior stereo display systems. The invention also increases the amount of information that can be provided/displayed to the viewer.

It will be appreciated that the two display generators are arranged at right angles to each other. In the illustrated embodiments shown in the drawings those display generators are in vertical planes that are perpendicular to each other and intersect at the axis 18. However, if desired, one display generator or image generator may be in a vertical plane and the other in a horizontal plane, e.g., above or below the display generator which is in the vertical plane. In such case adjustment may be made to the arrangement of the beam splitter so both images can be viewed in substantially superposed relation but with appropriate offset in the respective images provided by the image data thereof to obtain stereoscopic views. Also, in such case it may be necessary to alter the manner in which the image data to one of the display generators is inverted relative to the image data provided the other display generator to obtain proper image superpositioning.

The arrangement of the display generators 12a, 12b is such that the two are perpendicular, and with the beam splitter cooperative therewith the images are provided along a common light path toward an output of the monitor(s) of the invention for viewing as described above.

Figure 9:
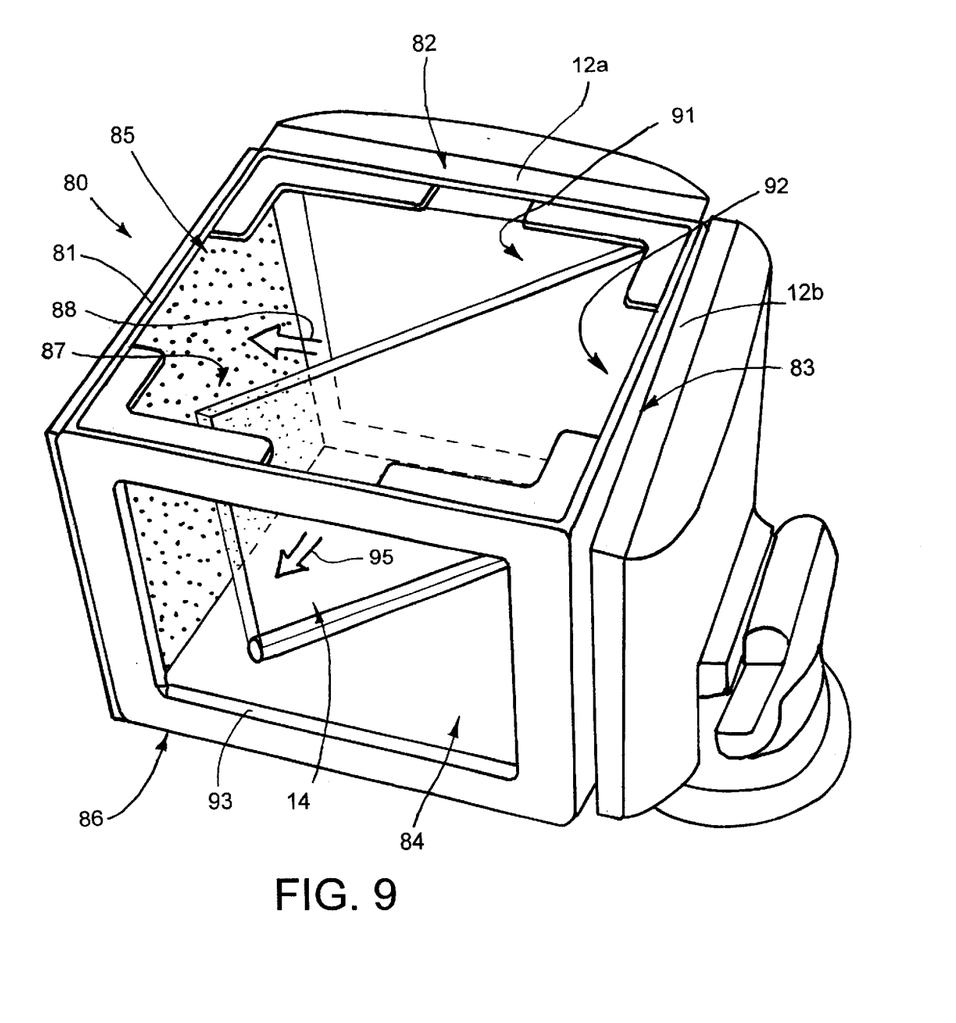
FIG. 9 is a schematic illustration of a display system according to an embodiment of the invention.

Briefly referring to FIG. 9, an embodiment of display system 80 according to the invention is illustrated. The display system 80 includes a monitor, such as one of the monitors 10, 20, 30 described above. A cubical structure 81 having an open interior and at least three open sides 82, 83, 84 provides for alignment of and/or support of the displays 12a, 12b (associated polarizers (not shown)), and the beam splitter 14. In the display system 80 the top and bottom 85, 86 are open (or either or both may be closed, as desired) and the side 87 includes a light absorbing material to absorb light 88 from the displays which is not intended for viewing. Such absorbed light is that provided by the display 12a and reflected by the beam splitter and that provided by the display 12b and transmitted by the beam splitter. Therefore, such light tends not to interfere with the viewed image received by the viewer 11 (FIG. 1). The cubical structure 81 may be a plastic, metal or other material. It may include a number of arms, frame members, etc., which are coupled together in relation to each other to obtain the form illustrated. The displays 12a, 12b may be positioned relative to the structure 81 or may be positioned in windowed openings 91, 92 in the respective open sides 82, 83. The windowed opening 93 in the front side 84 allows viewing of the beam splitter and light from the displays 12a, 12b, which is combined by the beam splitter to be provided as output light along a common light path 95 which may be viewed by the viewer to obtain a desired stereoscopic image.

INDUSTRIAL APPLICATION

The present invention may be used to provide stereoscopic (three dimensional) or monoscopic (two dimensional) images for viewing and/or for other use.

I claim:

1. A display system comprising a pair of displays, each having a polarized light output, the polarization for both displays being the same, the displays being at an angle to each other, and a beam splitter so positioned relative to the two displays at the bisectrix of said angle to combine images from the displays whereby one image is transmitted by the beam splitter and the other image is reflected by the beam splitter to provide direct view of images from the displays, and wherein the displays and the beam splitter are in respective planes that are parallel to a common linear axis, wherein light output from the displays is linear polarized, wherein the light output from one of the displays that is reflected by the beam splitter has a polarization direction at 45 degrees to the linear axis and is transmitted along an optical path, whereby upon reflection by the beam splitter the polarization direction of the reflected linear polarized light relative to the polarization direction of the linear polarized light prior to reflection is rotated 90 degrees about the optical path.

2. The display system of claim 1 in which the displays are flat panel LCODs.

3. The display system of claim 2 in which the LCDs are Identical and the polarization of the LCDs are at 45 degrees to the horizontal, whereby an image from one LCD transmitted through the beam splitter for viewing and the image from the other LCD which is reflected from the beam splitter will have linear polarization at right angles.

4. The display system of claim 2, in which a stereo pair makes up a selected region of the images from the displays.

5. The display system of claim 2, in which the displays are disposed at right angles and are in the vertical planes.

6. The display system of claim 2, in which one display for direct viewing through the beam splitter Is in the vertical plane and the display that is reflected in the beam splitter is in the horizontal plane.

7. The display system of claim, in which a stereo signal received by the display system is a stereo image pair and the display directly viewed through the beam splitter is in the vertical plane and is scanned from top to bottom and the display that Is reflected by the beam splitter in the horizontal plane and is scanned from bottom to top.

8. The display system of claim 6, in which the image signal for the display that is viewed by reflection by the beam splitter is inverted top to bottom.

9. The display system of claim 2, in which the image signal for the display that provides an image that is reflected is inverted from right to left electronically.

10. The display systems of claim 2, and in which a stereo signal is received as a stereo pair, one of the stereo pairs is provided to one display and the other of the stereo pairs is provided to the other display, and the display viewed through the beam splitter is scanned from left to right and the display that is reflected by the beam splitter for viewing is scanned from right to left.

11. The display system of claim 2 in which the LCDs are identical.

12. The display system of claim 3 in which polarizers are used to separate the images for right and left eye viewing.

13. The display system of claim 12, wherein the polarizers are polarized lenses in eyeglass frames.

14. The display system of claim 1, in which circular polarization is created by a single quarter wave plate located between the beam splitter and the eye of a viewer.

15. The display system of claim 1, in which a field sequential signal is displayed such that alternate fields are displayed on both displays so that each field is displayed for a full frame.

16. The display system of claim 1, in which the displays are made up of red, green and blue color sub pixels to form picture elements and are arranged to overlay each other so as to minimize color halos and color fringes.

17. The display system of claim 16, wherein the directional organization of providing data to color sub pixels in one display Is In one direction and the directional organization of providing data to color sub pixels in the other display is in the opposite direction.

18. The display system of claim 16, in which a field sequential signal is displayed such that alternate fields are displayed on the two displays so that each field is displayed for a full frame.

19. The display system of claim 1, further comprising a mount to position the displays relative to each other in perpendicular planes.

20. The display system of claim 19, wherein the mount includes a mount for the beam splitter.

21. The display system of claim 20, said mount including a cubical structure, the beam splitter being in the cubical structure and the cubical structure having open areas receiving light from the respective displays and passing such light to the beam splitter.

22. The display system of claim 1, further comprising a light absorber for absorbing light from the beam splitter which is not directed to a viewer for viewing.

23. The display system of claim 1, further comprising a package for containing the displays and the beam splitter.

24. The display system of claim 23, said package comprising cover portions coupled by a hinge and movable to contain in protected relation the displays and beam splitter and openable to provide access to and use of the displays and beam splitter.

25. The display system of claim 24, said cover portions being openable to permit arrangement of the displays In perpendicular planes with the beam splitter therebetween.

26. The display system of claim 24, said cover portions being openable to permit arrangement of the displays in parallel relation in a common plane.

27. The display system of claim 1, further comprising a data processing system for obtaining and organizing image data and presenting the image data for display.

28. The display system of claim 27, said data processing system including a processor, a memory and connections to the respective displays.

29. The display system of claim 28, further comprising operating software to invert the data for presentation to one of the displays for displaying the data in Inverted relation to the data displayed by the other displays.

30. The display system of claim 1, wherein the displays are flat panel displays having a generally rectangular shape and the direction of polarization for both displays is diagonal relative to such generally rectangular shape.

31. The display system of claim 1, wherein the beam splitter combines images from both displays to provide viewable overlapping images that respectively have crossed polarization.

32. The display system of claim 1, which circular polarization is created by a wave plate located between the beam splitter and the eye of a viewer.

33. A packaged stereoscopic display system, comprising a pair of displays, a beam splitter, a storage package containing the displays and beam splitter, the storage package including a pair of cover portions and a hinge connecting the cover portions allowing the cover portions to be closed to contain in protected closed relation the displays and beam splitter, and to be opened to expose the displays and beam splitter In respective operative relation such that the beam splitter is so positioned relative to the two displays that one can be viewed directly through the beam splitter and the other can be viewed by reflected light from the beam splitter to present stereoscopic images for viewing, and wherein in such operative relation the displays and the beam splitter are in respective planes that are parallel to a common linear axis, wherein light from the displays is linear polarized, wherein the light from one of the displays that is reflected by the beam splitter has a polarization direction at 45 degrees to the linear axis and is transmitted along an optical path, whereby upon reflection by the beam splitter the polarization direction of the reflected linear polarized light relative to the polarization direction of the linear polarized light prior to reflection is rotated 90 degrees about the optical path .

34. A method of displaying stereo images, comprising simultaneously displaying a left image on a display and a right Image on another display such that the left and right images have optical polarization in the same direction, and using a beam splitter so positioned relative to the two displays that one can be viewed directly through the beam splitter and the other can be viewed by reflected light from the beam splitter combining those images in a common light path such that the optical polarization of the left image portion and the right image portion are different in such common light path and wherein light forming said images is linear polarized light, and the polarization direction of the linear polarized light forming one of said images is at 45 degrees to a linear axis and is transmitted (propagates) along an optical path, said combining comprising reflecting into such common light path such linear polarized light forming said one of said images by using the beam splitter with the beam splitter in a plane that is parallel to and intersects the linear axis, whereby the polarization direction of the reflected linear polarized light relative to the polarization direction of the linear polarized light prior to reflection is rotated 90 degrees about the optical path.

35. The method of claim 34, further comprising discriminating the respective images in the common light path using optical polarization.

36. The method of claim 34, wherein the images are color images, each being composed of an assemblage of lines of different respective colors, and wherein the color image from one display is in an arrangement In one sequence and the color image from the other display is in an arrangement in the opposite sequence.

37. The method of claim 31, said displaying comprising displaying the images on respective Identical LCDs.

38. A method of presenting a stereoscopic image for viewing, comprising presenting a left eye image on a display, presenting a right eye image on another display that is at an angle relative to the first mentioned display, both said presenting steps presenting such images having optical polarization in the same direction, and using a beam splitter that is so positioned relative to the two displays that one can be viewed directly through the beam splitter and the other can be viewed by reflected light from the beam splitter combining In a substantially common light path the respective images such that the respective images in the common light path have different optical polarization, whereby the images can be separated based on polarization so that one image can be viewed directly through the beam splitter by one eye and the other can be viewed by reflected light from the beam splitter by the other eye, and wherein the displays are in respective planes that are parallel to a linear axis and light forming said images is linear polarized light, and the polarization direction of the linear polarized light forming one of said images is at 45 degrees to the linear axis and is transmitted (propagates) along an optical path, said combining comprising reflecting into such common light path such linear polarized light forming said one of said images by using the beam splitter with the beam splitter in a plane that is parallel to and intersects the linear axis, whereby the polarization direction of the reflected linear polarized light relative to the polarization direction of the linear polarized light prior to reflection is rotated 90 degrees about the optical path.

39. The method of claim 38, further comprising discriminating between the left eye image and right eye image for viewing by respective left and right eyes the respective left and right eye images from the light in the common light path.

40. The method of claim 38, further comprising inverting the image data for one of the images for presenting for viewing in substantially superposed relation to the other image.

41. The method of claim 40, said inverting comprising inverting from top to bottom.

42. The method of claim 40, said inverting comprising inverting from left to right.

43. The method of claim 38, wherein both said presenting steps present such images having linear polarization.

44. The method of claim 38, said presenting comprising presenting Images on respective identical LCDs.

45. A display system comprising a pair of displays, each having a polarized light output, the polarization for both displays being the same, the displays being at an angle to each other, and a beam splitter so positioned relative to the two displays at the bisectrix of said angle to combine images from the displays whereby one image is transmitted by the beam splitter and the other image is reflected by the beam splitter to provide direct view of images from the displays, and wherein the displays and the beam splitter are in respective planes that are parallel to a common linear axis, wherein the light incident on the beam splitter from the two displays has circular polarization in the same sense, whereby upon reflection by the beam splitter the polarization sense of the reflected circular polarized light is reversed relative to the polarization sense of the circular polarized light prior to reflection.

46. The display system of claim 45, in which light output from the displays is linear polarized, and wherein the polarization is modified by quarter wave plates, respectively, in the light paths from the displays so that the images from the respective displays as viewed via the beam splitter are separated by right and left circular polarized light.

47. The display system of claim 45, wherein the polarization for both displays Is circular.

48. The display system of claim 47, wherein the beam splitter combines images from both displays to provide viewable overlapping images that respectively have circular polarization in opposite directions.

49. The display system of claim 45, in which the displays are flat panel LCDs.

50. The display system of claim 49, wherein the flat panel LCDs are identical.

51. The display system of claim 45, wherein the light form both displays is left circular polarized light.

52. The display system of claim 45, wherein the light from both displays Is right circular polarized light.

53. A method of displaying stereo images, comprising simultaneously displaying a left image on a display and a right image on another display such that the left and right images have optical polarization in the same direction, and using a beam splitter so positioned relative to the two displays that one can be viewed directly through the beam splitter and the other can be viewed by reflected light from the beam splitter combining those images In a common light path such that the optical polarization of the left image portion and the right image portion are different In such common light path, and wherein the light representing the respective images as it is incident on the beam splitter has circular polarization in the same sense.

said combining comprising reflecting light representing one of such images, whereby such reflecting reverses the polarization direction of the reflected light.

54. The method of claim 53, wherein said displaying comprises displaying such left and right images having circular polarization.

55. The method of claim 53, further comprising discriminating the respective images in the common light path using optical polarization.

56. The method of claim 53, wherein the images are color images, each being composed of an assemblage of lines of different respective colors, and wherein the color image from one display Is In an arrangement in one sequence and the color image from the other display is in an arrangement in the opposite sequence.

57. The method of claim 53, wherein the sense of light from both displays is left circular polarized light.

58. The method of claim 53, wherein the sense of light from both displays is right circular polarized light.

59. The method of claim 53, said displaying comprising displaying images in identical LCDs.

60. A method of presenting a stereoscopic image for viewing, comprising presenting a left eye image on a display, presenting a right eye image on another display that is at an angle relative to the first mentioned display, both said presenting steps presenting such images having optical polarization in the same direction, and using a beam splitter that is so positioned relative to the two displays that one can be viewed directly through the beam splitter and the other can be viewed by reflected light from the beam splitter combining in a substantially common light path the respective images such that the respective images in the common light path have different optical polarization, whereby the images can be separated based on polarization so that one image can be viewed directly through the beam splitter by one eye and the other can be viewed by reflected light from the beam splitter by the other eye, and wherein the displays are in respective planes that are parallel to a linear axis and light forming said images is polarized light, wherein the polarized light representing respective images is circular polarized light having the same sense, wherein said combining comprising reflecting into such common light path such polarized light forming said one of said Images by using the beam splitter with the beam splitter in a plane that is parallel to and intersects the linear axis, whereby the polarization sense of polarization of the reflected circular polarized light is reversed by reflection by the beam splitter such that the sense of the light reflected by the beam splitter is opposite the sense of polarization of the light transmitted by the beam splitter.

61. The method of claim 60, wherein both said presenting steps present such images having circular polarization.

62. The method of claim 60, further comprising discriminating between the left eye image and right eye image for viewing by respective left and right eyes the respective left and right eye images from the light in the common light path.

63. The method of claim 60, further comprising inverting the image data for one of the images for presenting for viewing in substantially superposed relation to the other image.

64. The method of claim 63, said inverting comprising inverting from top to bottom.

65. The method of claim 63, said inverting comprising Inverting from left to right.

66. The method of claim 60, wherein the sense of light from both displays is left circular polarized light.

67. The method of claim 60, wherein the sense of light from both displays is right circular polarized light.

68. The method of claim 60, said displaying comprising displaying images in identical LCDs.

* * * * *

UNITED STATES PATENT AND TRADEMARK OFFICE
CERTIFICATE OF CORRECTION

PATENT NO. : 6,703,988 B1  Page 1 of 1
DATED : March 9, 2004
INVENTOR(S) : Fergason, James L.

It is certified that error appears in the above-identified patent and that said Letters Patent is hereby corrected as shown below:

Column 10,
Line 47, omit the word "to" between "operation" and "Therefore"

Column 12,
Line 23, replace "LCODs" with -- LCDs --.
Line 37, replace "claim," with -- claim 6, --.

Column 13,
Line 58, insert the word -- in -- between "claim 1," and "which".

Column 16,
Line 5, replace "form" with -- from --.

Signed and Sealed this

First Day of June, 2004

JON W. DUDAS
*Acting Director of the United States Patent and Trademark Office*

(12) EX PARTE REEXAMINATION CERTIFICATE (7416th)
United States Patent
Fergason (10) Number: US 6,703,988 C1
(45) Certificate Issued: Mar. 23, 2010

(54) MONITOR FOR SHOWING HIGH-RESOLUTION AND THREE-DIMENSIONAL IMAGES AND METHOD

(75) Inventor: James L. Fergason, Redwood City, CA (US)

(73) Assignee: Fergason Patent Properties LLC, Menlo Park, CA (US)

Reexamination Request:
No. 90/007,318, Nov. 24, 2004

Reexamination Certificate for:
Patent No.: 6,703,988
Issued: Mar. 9, 2004
Appl. No.: 09/611,541
Filed: Jul. 7, 2000

Certificate of Correction issued Jun. 1, 2004.

Related U.S. Application Data
(60) Provisional application No. 60/142,752, filed on Jul. 8, 1999.

(51) Int. Cl.
G02B 27/22 (2006.01)
G02B 27/26 (2006.01)
H04N 13/00 (2006.01)

(52) U.S. Cl. .......... 345/6; 345/4; 345/5; 345/7; 345/9; 348/52; 348/54; 348/57; 348/58; 348/59; 348/E13.038; 348/E13.039; 348/E13.042; 356/124.5; 356/126; 356/364; 356/369

(58) Field of Classification Search .......... 348/51, 348/48, 52; 359/462, 464, 465
See application file for complete search history.

(56) References Cited

U.S. PATENT DOCUMENTS

| 2,845,618 | A |   | 7/1958  | Huffman      |         |
|-----------|---|---|---------|--------------|---------|
| 3,777,059 | A |   | 12/1973 | Wilkey, Jr.  |         |
| 4,385,806 | A |   | 5/1983  | Fergason     |         |
| 5,074,645 | A |   | 12/1991 | Gold et al.  |         |
| 5,283,640 | A | * | 2/1994  | Tilton       | 348/42  |
| 5,300,942 | A |   | 4/1994  | Dolgoff      |         |
| 5,410,345 | A | * | 4/1995  | Eichenlaub   | 348/59  |
| 5,416,496 | A |   | 5/1995  | Wood         |         |
| 5,421,589 | A |   | 6/1995  | Monroe       |         |
| 5,453,859 | A |   | 9/1995  | Sannohe et al.|        |
| 5,598,282 | A |   | 1/1997  | DeGroof      | 349/15  |
| 5,644,427 | A |   | 7/1997  | Omori et al. |         |
| D385,533  | S |   | 10/1997 | Adams        |         |
| 5,717,422 | A |   | 2/1998  | Fergason     |         |
| 5,777,665 | A | * | 7/1998  | McNelley et al. | 348/14.16 |
| D415,124  | S |   | 10/1999 | Rooyakkers et al. |    |
| 5,976,017 | A |   | 11/1999 | Omori et al. |         |

(Continued)

FOREIGN PATENT DOCUMENTS

| DE | 195 34 750   | 3/1997 |
| EP | 0 505 998 A2 | 9/1992 |
| EP | 1 037 093    | 9/2000 |

(Continued)

OTHER PUBLICATIONS

Partial International Search Report for International Application No. PCT/US05/042499 dated Apr. 11, 2006.

(Continued)

*Primary Examiner*—Majid A. Banankhah (57) ABSTRACT

A display system or monitor arrangement for stereoscopic displaying of images includes a pair of displays for providing respective left eye and right eye images and arranged in perpendicular intersecting planes, a beam splitter for combining the images from the displays in a common light path, and a means to discriminate between respective images to present the respective left and right eye images to the eyes of a viewer for viewing. Image discriminating functions may be obtained using plane polarized light characteristics and/or circular polarized light characteristics. A package arrangement retains the display a system components for storage or use; and a cubical mount structure may provide alignment and positioning of respective parts of the display system. Display methods for displaying stereoscopic images in a common light path are included.

U.S. PATENT DOCUMENTS

| | | | |
|---|---|---|---|
| D428,864 S | 8/2000 | Rooyakkers et al. | |
| 6,130,784 A | 10/2000 | Takahashi | |
| 6,160,666 A | 12/2000 | Rallison et al. | |
| 6,163,022 A * | 12/2000 | Yasui et al. | 250/208.1 |
| D438,206 S | 2/2001 | Joshi | |
| 6,184,969 B1 | 2/2001 | Fergason | |
| D440,543 S | 4/2001 | Kodimer | |
| 6,212,068 B1 | 4/2001 | Rooyakkers et al. | |
| 6,271,924 B1 * | 8/2001 | Ngoi et al. | 356/489 |
| D455,427 S | 4/2002 | Vejbrink | |
| 6,400,394 B1 * | 6/2002 | Kim et al. | 348/51 |
| 6,449,090 B1 * | 9/2002 | Omar et al. | 359/465 |
| 6,522,310 B1 * | 2/2003 | Kim | 345/6 |
| 6,593,957 B1 | 7/2003 | Christie | |
| 6,611,241 B1 | 8/2003 | Firester et al. | |
| 6,633,306 B1 | 10/2003 | März et al. | |
| 6,703,988 B1 | 3/2004 | Fergason | |
| D492,676 S | 7/2004 | Monson et al. | |
| 6,765,640 B1 * | 7/2004 | Acosta et al. | 349/119 |
| 2004/0114080 A1 | 6/2004 | Miyachi | |
| 2004/0223218 A1 | 11/2004 | Putilin et al. | |

FOREIGN PATENT DOCUMENTS

| | | | |
|---|---|---|---|
| ES | 2 024 269 | | 2/1992 |
| JP | 63-074027 | * | 9/1986 |
| JP | 5-168046 | | 7/1993 |
| JP | 05-168046 | | 7/1993 |
| JP | 06 160834 | | 6/1994 |

OTHER PUBLICATIONS

International Search Report and Written Opinion for International Application No. PCT/US2005/042306 dated Jun. 27, 2006.

Pat. Abst. Jp v017 n575 E 1449.

International Search Report and Written Opinion for International Application No. PCT/US2006/028263 dated Nov. 29, 2006.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–6, 8 and 12–68 are cancelled.

Claims 7 and 9–11 are deterrmined to be patentable as amended.

7. [The] *A* display system [of claim 6, in which] *comprising a pair of displays, each having a polarized light output, the polarization direction for both displays being the same, the displays being at an angle to each other, and a beam splitter so positioned relative to the two displays at the bisectrix of said angle to combine images from the displays whereby one image is transmitted by the beam splitter and the other image is reflected by the beam splitter to provide direct view of images from the displays, and*

*wherein the displays and the beam splitter are in respective planes that are parallel to a common linear axis,*

*wherein light output from the displays is linear polarized,*

*wherein the light output incident on the beam splitter from one of the displays has a polarization direction at 45 degrees to the linear axis prior to reflection, the light output being transmitted along an optical path,*

*whereby upon reflection by the beam splitter the polarization direction of the reflected linear polarized light relative to the polarization direction of the linear polarized light prior to reflection is rotated 90 degrees about the optical path, and*

*wherein one display for direct viewing through the beam splitter is in a vertical plane and the display that is reflected in the beam splitter is in a horizontal plane, and* a stereo signal received by the display system is a stereo image pair and the display directly viewed through the beam splitter is in the vertical plane and is scanned from top to bottom and the display that is reflected by the beam splitter in the horizontal plane and is scanned from bottom to top.

9. The display system of claim [2] *10*, in which the image signal for the display that provides an image that is reflected is inverted from right to left electronically.

10. [The] *A* display system [of claim 2, and in which] *comprising a pair of displays, each having a polarized light output, the polarization direction for both displays being the same, the displays being at an angle to each other, and a beam splitter so positioned relative to the two displays at the bisectrix of said angle to combine images from the displays whereby one image is transmitted by the beam splitter and the other image is reflected by the beam splitter to provide direct view of images from the displays, and*

*wherein the displays and the beam splitter are in respective planes that are parallel to a common linear axis,*

*wherein light output from the displays is linear polarized,*

*wherein the light output incident on the beam splitter from one of the displays has a polarization direction at 45 degrees to the linear axis prior to reflection, the light output being transmitted along an optical path,*

*whereby upon reflection by the beam splitter the polarization direction of the reflected linear polarized light relative to the polarization direction of the linear polarized light prior to reflection is rotated 90 degrees about the optical path, and*

*wherein* a stereo signal is received as a stereo pair, one of the stereo pairs is provided to one display and the other of the stereo pairs is provided to the other display, and the display viewed through the beam splitter is scanned from left to right and the display that is reflected by the beam splitter for viewing is scanned from right to left.

11. The display system of claim [2] *10* in which the LCDs are identical.

* * * * *